(12) United States Patent
Hogan et al.

(10) Patent No.: US 12,403,940 B2
(45) Date of Patent: Sep. 2, 2025

(54) SYSTEM AND METHOD FOR SUPPORTING AND CONNECTING CONVEYOR TRACK

(71) Applicant: ATS Automation Tooling Systems Inc., Cambridge (CA)

(72) Inventors: Roger Hogan, Cambridge (CA); Blake Robert Lambert, Cambridge (CA); Albert Kleinikkink, Cambridge (CA)

(*) Notice: Subject to any disclaimer, the term of this patent is extended or adjusted under 35 U.S.C. 154(b) by 892 days.

(21) Appl. No.: 17/559,543

(22) Filed: Dec. 22, 2021

(65) Prior Publication Data

US 2022/0204057 A1  Jun. 30, 2022

Related U.S. Application Data

(60) Provisional application No. 63/131,562, filed on Dec. 29, 2020.

(51) Int. Cl.
*B61B 13/00* (2006.01)
*B65G 54/02* (2006.01)

(52) U.S. Cl.
CPC ............. *B61B 13/00* (2013.01); *B65G 54/02* (2013.01)

(58) Field of Classification Search
CPC ................................ B61B 13/00; B65G 54/02
See application file for complete search history.

(56) References Cited

FOREIGN PATENT DOCUMENTS

CN          111806993 A   * 10/2020  ............. B65G 35/00

OTHER PUBLICATIONS

Extended European Search Report, European Patent Office, on corresponding EP Application No. 21217496.5, dated Apr. 8, 2022.

* cited by examiner

*Primary Examiner* — Robert J McCarry, Jr.
(74) *Attorney, Agent, or Firm* — Amarok IP Inc.; Neil W. Henderson

(57) ABSTRACT

A system and method for supporting and connecting conveyor track sections. The system including a mounting stand including: a base configured to connect with a stable surface; and a plurality of adjustable sections, with at least one of each of the plurality of adjustable sections being adjustable in relation to the base and the track section in at least one of at least 5 degrees of freedom, wherein at least some of the plurality of adjustable sections connect with the track sections. The method including: installing and securing a mounting stand on a stable surface; attaching a temporary clamp to align adjacent track sections; adjusting the mounting stand about at least 5 degrees of freedom to match with the adjacent track sections; connecting the mounting stand to the adjacent track sections while maintaining the alignment provided by the temporary clamp; and releasing the temporary clamp.

11 Claims, 14 Drawing Sheets

SYSTEM AND METHOD FOR SUPPORTING AND CONNECTING CONVEYOR TRACK

FIELD

The present disclosure relates generally to a system and method for supporting and connecting conveyor track and, more particularly, to a system and a method for connecting conveyor track sections such that rails on the track sections can be aligned even when there are issues with manufacturing and environment tolerances.

BACKGROUND

In conventional conveyor systems, a moving element is controlled to move along a track or rails on a track, typically via wheels/bearings that are provided on the moving element. In order to make a conveyor system easier to construct, the track is often formed in sections and the sections are then attached together to form a longer track. The alignment of the track sections, and in particular, the rails that the moving element will travel on, can be important to reduce or eliminate jarring, wear, noise or the like at the joints between track sections as a moving element/bearings move along the track. The alignment can also be important in reducing/preventing wear on the bearings and/or wheels and rails/track that may be caused by misalignment.

A linear motor conveyor system is one in which a moving element is moved by electromotive force. For example, the moving element may include a magnet and the track may include an electromagnetic field generator. The moving element is placed on the track such that the magnet is acted on by the electromagnetic field in order to generate an electromotive force and move the moving element along the track.

In linear motor conveyor systems, forces, including forces causing acceleration, on the moving element can be high in order to move or stop the moving element quickly in order to increase production speeds. When the moving element is moving quickly along a track, it is even more important for adjacent track sections to be connected in a way that maintains alignment between the bearing surfaces/rails of the track sections. In particular, it can be important to allow for tolerance errors introduced by differing contours of surfaces on the track sections, surfaces on which the track sections are mounted, or the like in order to ensure a smooth ride over the joints in the track sections.

Linear motor conveyor systems are becoming more popular on assembly lines and, as such, track sections need to be assembled more quickly and by less skilled workers. This can lead to issues with maintenance and control if moving elements/bearings encounter a misalignment when traversing from one track section to another. Similar issues apply with regard to various other kinds of conveyors, if alignment of track sections can be improved, there will generally be a reduction in noise, wear, vibration, and the like.

As such, there is a need for an improved system and method for connecting conveyor track sections and, in particular, aligning rails of conveyor track sections.

SUMMARY

According to an aspect herein, there is provided a system for supporting and connecting conveyor track sections, the system including: a mounting stand having at least 5 degrees of freedom, the mounting stand including: a base configured to connect with a stable surface; and a plurality of adjustable sections, with at least one of each of the plurality of adjustable sections being adjustable in relation to the base and the track section in at least one of the degrees of freedom, wherein at least some of the plurality of adjustable sections connect with the track sections.

In some cases, the plurality of adjustable sections may include: a first adjustable section configured to move along a first axis toward and away from the track section as a first degree of freedom; a second adjustable section configured to move along a second axis in a vertical direction in relation to the track section as a second degree of freedom; a third adjustable section configured to rotate about a third axis in a horizontal direction in relation to the track section as a third degree of freedom; a fourth adjustable section configured to rotate about the first axis in relation to the track section as a fourth degree of freedom; and a fifth adjustable section configured to rotate about the second axis in relation to the track section as a fifth degree of freedom. Further, in some cases, the fourth adjustable section may also be configured to move along the third axis in relation to the track section as a sixth degree of freedom. Still further, in some cases, the first adjustable section and the second adjustable section may be connected to be movable in relation to each other. Still further, the second adjustable section and the third adjustable section may be connected such that the second adjustable section moves together with the third adjustable section when the third adjustable section is rotated in relation to the base. Yet still further, in some cases, the fourth adjustable section and the fifth adjustable section may be connected such that the fifth adjustable section moves together with the fourth adjustable section when the fourth adjustable section is rotated. Also, in some cases, the fifth adjustable section may be configured to move independently of the others of the plurality of adjustable sections. In some cases, the fifth adjustable section may be configured to connect with the track section.

According to another aspect herein, there is provided a method for supporting and connecting conveyor track sections, the method including: installing and securing a mounting stand on a stable surface; attaching a temporary clamp to align adjacent track sections; adjusting the mounting stand about at least 5 degrees of freedom to match with the adjacent track sections; connecting the mounting stand to the adjacent track sections while maintaining the alignment provided by the temporary clamp; and releasing the temporary clamp.

In some cases, the mounting stand may include: a base configured to connect with the stable surface; and a plurality of adjustable sections, such that the adjusting the mounting stand about at least 5 degrees of freedom may include adjusting each of the plurality of adjustable sections in relation to the base and the track sections to match with the adjacent track sections. In some cases, the adjusting each of the plurality of adjustable sections may include: adjusting a first adjustable section along a first axis toward and away from the track section as a first degree of freedom; adjusting a second adjustable section along a second axis in a vertical direction in relation to the track section as a second degree of freedom; adjusting a third adjustable section by rotating about a third axis in a horizontal direction in relation to the track section as a third degree of freedom; adjusting a fourth adjustable section by rotating about the first axis in relation to the track section as a fourth degree of freedom; and adjusting a fifth adjustable section by rotating about the second axis in relation to the track section as a fifth degree of freedom. In this case, the adjusting may further include adjusting the fourth adjustable section along the third axis in relation to the track section as a sixth degree of freedom.

In some cases, the attaching a temporary clamp may include placing an alignment device onto a rail of the adjacent track sections and clamping the adjacent track sections such that the alignment device maintains alignment of the rail as between the adjacent track sections. In some cases, the alignment device may be a dowel configured to fit within a feature of the rail or of the track section. In some cases, the alignment device may provide alignment in both horizontal and vertical directions, for example, when the dowel extends horizontally and abuts against an upper or lower feature of the rail or the track sections.

According to another aspect herein, there is provided a mounting stand for supporting and connecting conveyor track sections, the mounting stand including: a base configured to connect with a stable surface; and a plurality of adjustable sections, wherein the plurality of adjustable sections may include: a first adjustable section configured to move along a first axis toward and away from the track section as a first degree of freedom; a second adjustable section configured to move along a second axis in a vertical direction in relation to the track section as a second degree of freedom; a third adjustable section configured to rotate about a third axis in a horizontal direction in relation to the track section as a third degree of freedom; a fourth adjustable section configured to rotate about the first axis in relation to the track section as a fourth degree of freedom; and a fifth adjustable section configured to rotate about the second axis in relation to the track section as a fifth degree of freedom, wherein at least some of the plurality of adjustable sections connect with the track sections.

BRIEF DESCRIPTION OF THE DRAWINGS

Other aspects and features of the present disclosure will become apparent to those ordinarily skilled in the art upon review of the following description of specific embodiments in conjunction with the accompanying figures.

Embodiments of the present disclosure will now be described, by way of example only, with reference to the attached Figures.

DETAILED DESCRIPTION

Figure 1:
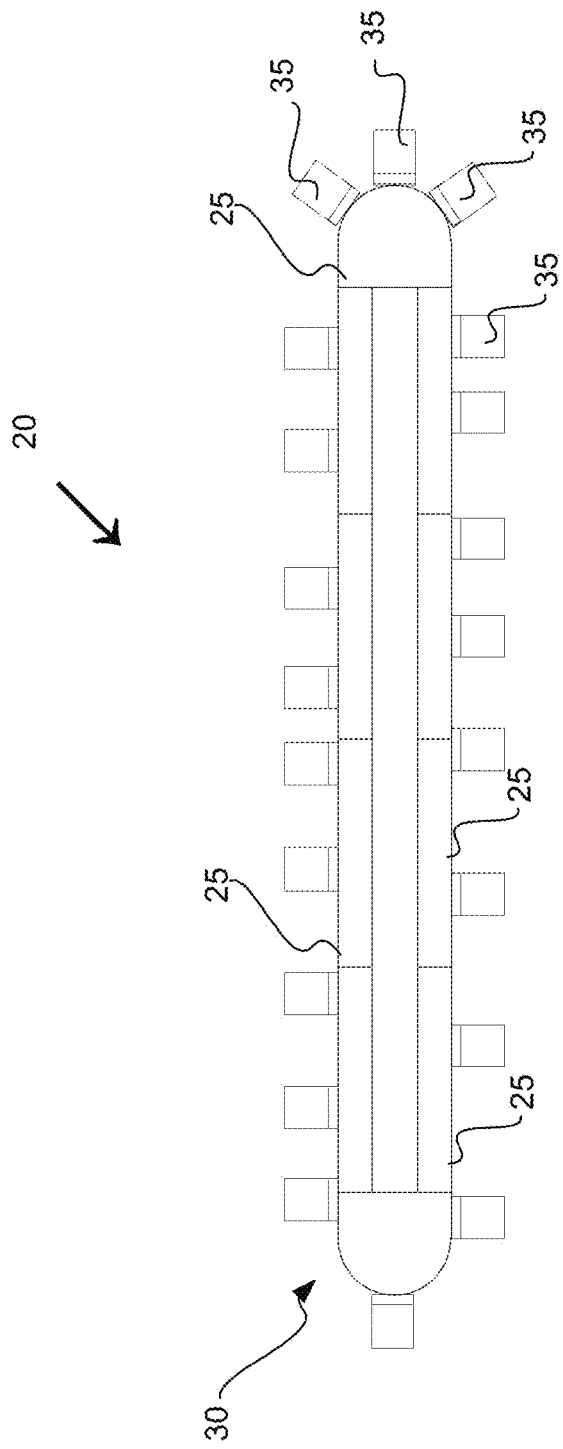
FIG. 1 shows an embodiment of a conveyor system that includes a track and moving elements.

Generally, the present disclosure provides an improved system and method of connecting and mounting conveyor track sections. Generally, it is intended that the conveyor track sections (sometimes referred to as track segments) can achieve an alignment tolerance of 100 microns or less, 50 microns or less, 40 microns or less, or 25 microns or less. Embodiments herein involve an adjustable support/mounting stand for the track sections and a method that provides for: connecting a first and second track section in place in an aligned position with a temporary connector; adaptively connecting a mounting stand to each adjacent track section to hold the two track sections in relation to each other with limited possible movement from an aligned position. The adaptive support/mounting stand is provided with adjustment mechanisms that allow the mounting stand to adapt to variances in dimensions of the surface on which the track sections are mounted and to adapt to manufacturing variances in the track sections themselves.

In some cases, track sections may be manufactured with a first side including a guide rail and a second side, typically flat, opposite the first side, where the first side and the second side are separated by a track thickness. In this example, the track thickness from the first side to the second side may vary between different track sections due to manufacturing tolerances. This can be an issue if the manufacturing tolerance is larger than the alignment tolerance of the guide rail. How flat the second side will be may also vary within manufacturing tolerances and the height of the second side may also be different. Clamping, or otherwise joining, a first and second track section in place to align the guide rails of the first track section and the second track section within a first alignment tolerance may cause the second sides (i.e. the sides to which a support/mounting stand may attach) of the track sections to be non-aligned due to a difference in thickness/flatness/height between the first and second track sections. In other words, alignment of the guide rails within an alignment tolerance may still result in the opposite side of the track sections to be non-aligned. A support that cannot accommodate non-aligned attachment features/surfaces, including those on which the support is secured may force the track sections out of alignment, and thereby put the guide rails out of alignment.

In embodiments herein, an adaptive mounting stand is configured to adapt to non-aligned attachment features/surfaces by including a plurality of adjustment mechanisms to allow at least a part/section of the adaptive mounting stand to adjust. The adaptive mounting stand may then be affixed to the track sections, where any difference in alignment between the base or the attachment surfaces of the two track sections is accommodated by the adaptability of the adaptive mounting stand. In other words, the adaptive mounting stand may be adaptively connected to the two track sections to support the two track sections without impacting the alignment of the rails on the track sections, which is set by a temporary connector.

Throughout this specification and the appended claims, the adaptive mounting stand may adapt to variances in various dimensions within the manufacturing tolerance of the two track sections by movement in various degrees of freedom.

In order to make a conveyor system and the accompanying track sections easier to assemble, the method of connecting the track sections should be as simple as possible. A non-exclusive example of a simple method of connecting track sections is a method by which a person with relatively basic mechanical skills may perform the assembly process by following a series of instructions that achieve alignment of the guide rails within an alignment tolerance and thereby allow smooth operation of the conveyor system. As noted above, in some cases, the alignment tolerance may be less than or equal to 100 microns, less than or equal to 50 microns, less than or equal to 40 microns, or less than or equal to 25 microns. In still other cases, the alignment tolerance may be any value in the range of equal to 100 microns or less.

In the following description, the examples relate to a linear motor conveyor system but the same or similar mounting stand and method can generally be used with other conveyor systems that would benefit from alignment of tracks and easier mechanical assembly. Further, various embodiments are shown and similar reference numerals may be used to designate similar parts/elements in the various embodiments. It will be understood that various elements from differing embodiments may be used with other embodiments or may not be specifically needed in a particular embodiment.

FIG. 1 shows a schematic diagram of an example conveyor system 20. The conveyor system 20 includes one or more track sections 25 defining a track 30. A plurality of moving elements 35 are provided to the track 30 and move around on the conveyor system 20. In a manufacturing environment, the moving elements 35 are intended to travel between workstations (not shown) and may support a pallet or product (not shown) that is to be operated on automatically by, for example, a robot, while moving or at a workstation or may travel to a workstation or other work area intended for manual operations. Through the operation of the conveyor system 20, various operations are performed to provide for the assembly of a product. In this disclosure, the terms "moving element" and "pallet" may sometimes be used interchangeably, depending on the context.

Figure 2:
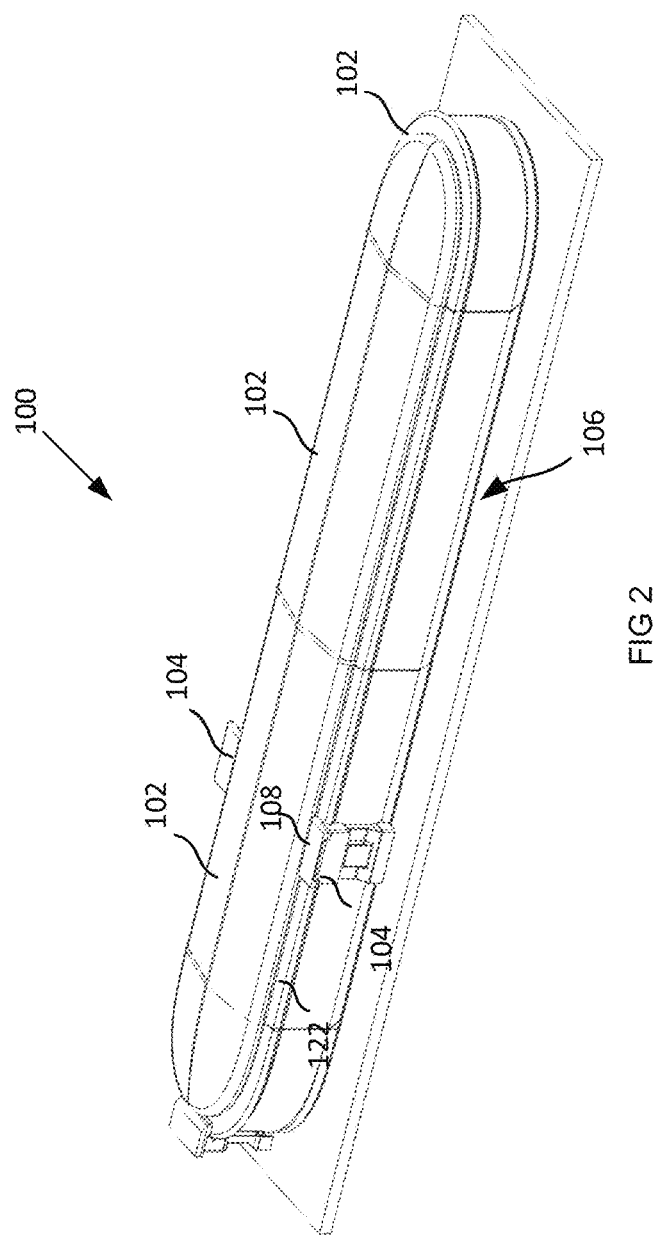
FIG. 2 shows another embodiment of a conveyor system that includes a track and moving elements.

FIG. 2 illustrates a perspective view of another example conveyor system 100 having one or more track sections 102 defining a track 106, and one or more moving elements 104 which are configured to ride, move or travel along the track 106. In FIG. 2, there are four straight track sections 102, and two corner track sections 102, and three moving elements 104. However, it will be understood that the modular nature of the track sections allow for various sizes and shapes of conveyors and any appropriate number of moving elements. Some of the principles of operation of a similar track section are described in more detail in, for example, U.S. Pat. No. 8,397,896 to Kleinikkink et al., which is hereby incorporated herein by reference.

As noted, the conveyor system 100 may include the plurality of track sections 102, which are typically mechanically self-contained and separable from one another so as to be modular in nature. In this embodiment, the track sections 102 are mounted on a support (not shown in FIG. 2) so as to align and abut one another in order to form a longer track. In order to be modular, each track section 102 may house electronic circuitry for powering and controlling the track section 102.

In a linear motor conveyor system 100, the track 106 may produce a magnetic force for moving the moving element 104 along the track 106. The magnetic force can also capture, support or hold the moving element 104 on the track 106. The magnetic force is at least partly generated by the interaction of the magnetic flux created by embedded coils of the track 106 and magnetic elements of the moving element 104.

Figure 3:
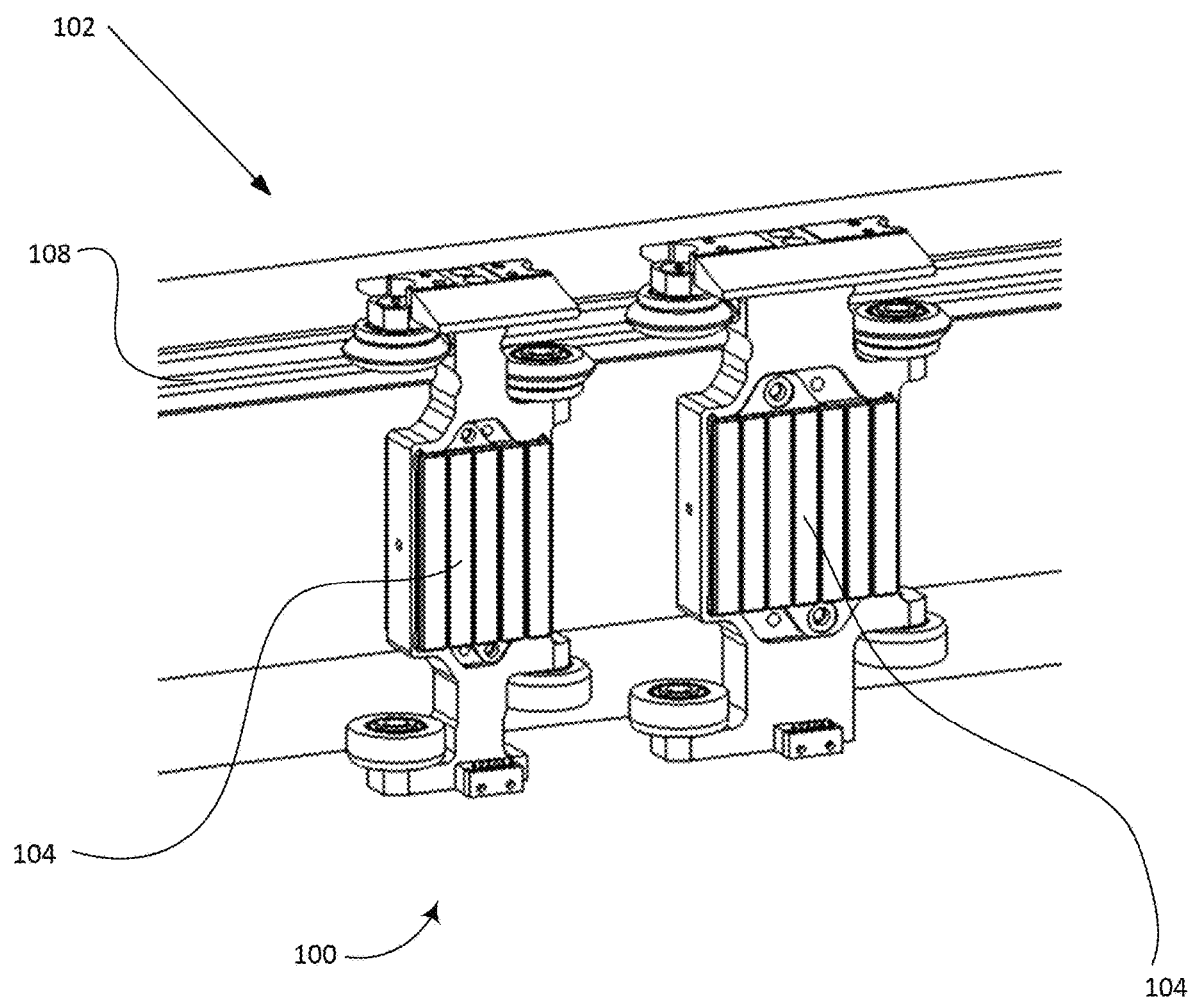
FIG. 3 shows an embodiment of a track section.
Figure 4:
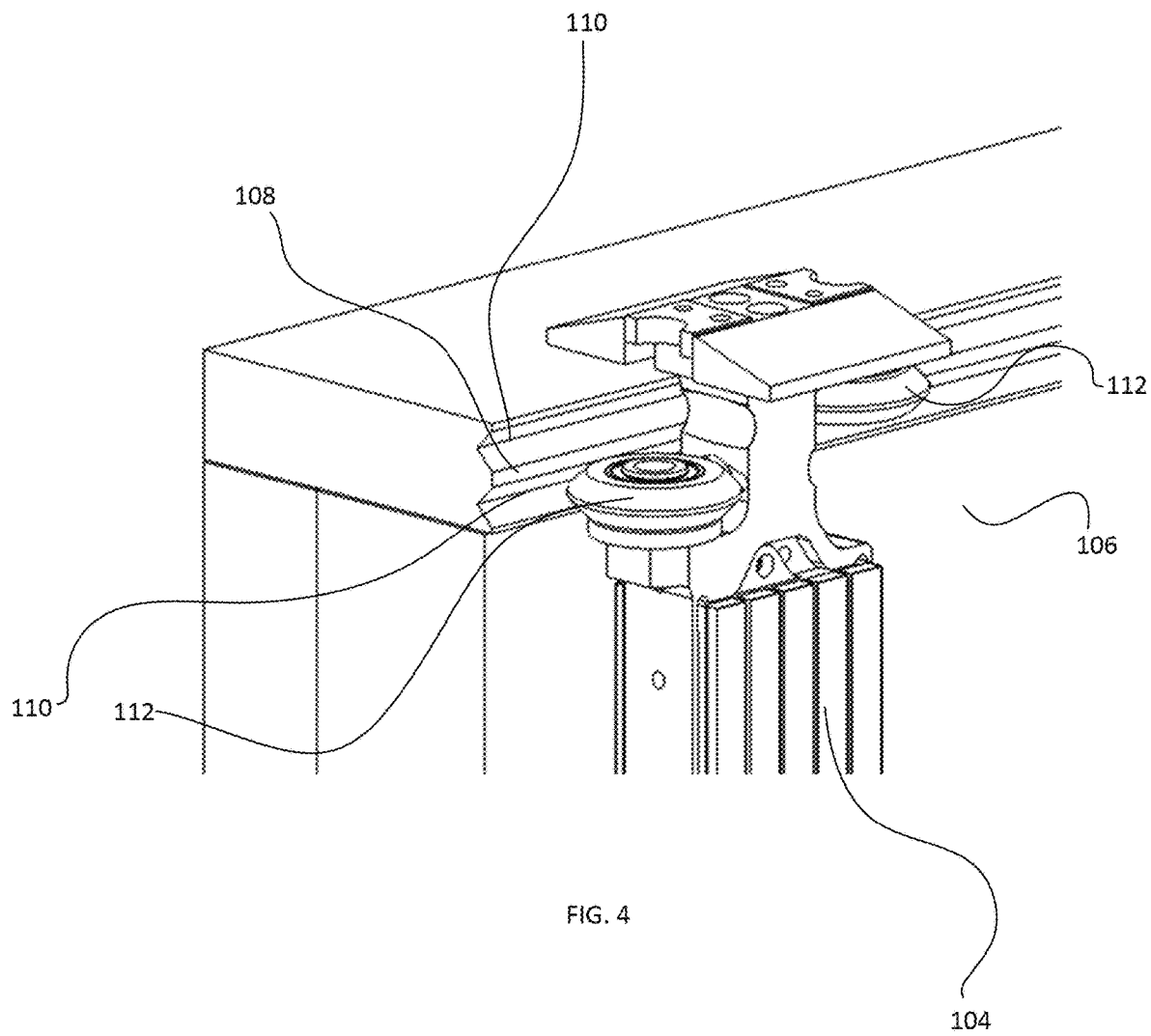
FIG. 4 shows an end of the track section of FIG. 3.

FIG. 3 illustrates an embodiment of a linear motor conveyor system 100 that includes the track section 102 and moving elements 104. FIG. 4 illustrates an end of the track section 102, showing the shape of a guide rail 108. The track 106 may be made up of track sections 102, joined end-to-end, with each guide rail 108 of each track section 102 aligned with the guide rail 108 of adjacent track sections 102. In the embodiment shown in FIG. 4, the track section 102 includes a guide rail 108 located in an upper portion of track section 102, and the guide rail 108 has dual shaped grooves 110. The moving elements 104 include bearings 112 that are correspondingly shaped in order to run along the guide rail 108, each bearing 112 running inside a respective shaped groove 110. In this example, the bearings 112 are offset such that, for a moving element 104 having two shaped bearings 112, each shaped bearing may run inside a separate respective shaped groove 110. It will be understood that the rails and bearings may have any of various shapes, including flat, depending on the needs of the conveyor system 100.

In some embodiments, the track section 102 may produce a magnetic force for moving the moving element 104 along the track section 102. The magnetic force can also capture/hold the moving element 104 on the track section 102. In some cases, the magnetic force is created by the interaction of the magnetic flux created by coils (not shown) embedded in/under the track section and magnetic elements (not shown) of the moving element 104. The magnetic force can be thought of as having a motive force component for directing movement of the moving element 104 along a direction of travel on the track 102, and a capturing force component to laterally hold the moving element 104 on the track 102 and in spaced relation to the track surface. In at least some conveyor systems, the motive force and the capturing force can be provided by the same magnetic flux.

Generally speaking, the track sections 102 will be mounted on a support structure (not shown in FIGS. 3 and 4) so as to align and abut one another in order to form the track 106. In order to be modular, each track section 102 may house self-contained electronic circuitry for powering and controlling the track section. Further, each track section 102 may be controlled by a control system.

Figure 5A:
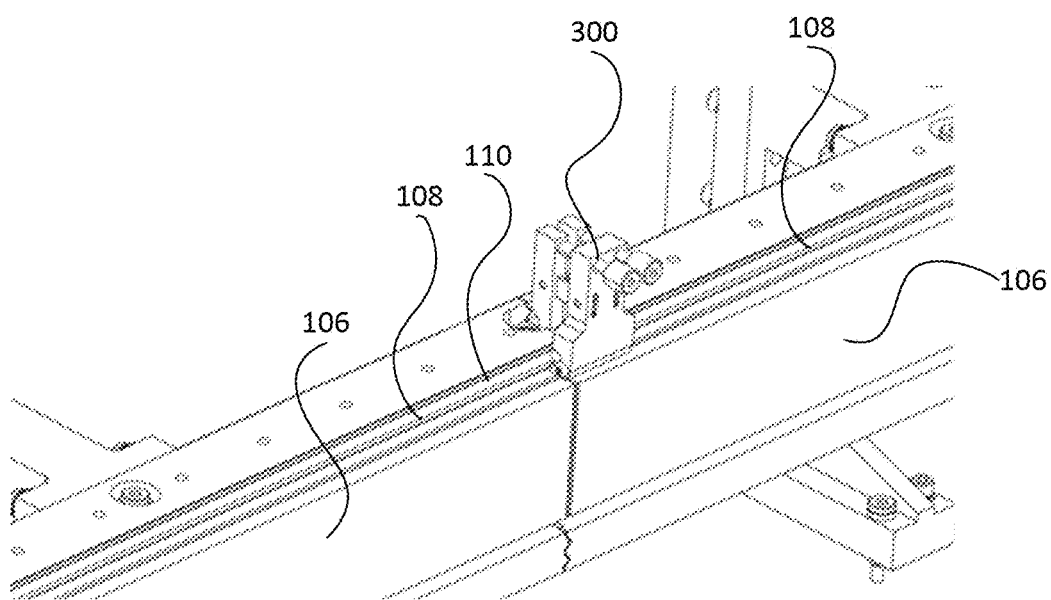
FIG. 5A shows a front perspective view of an embodiment of a clamp that is attached to two track sections.
Figure 5B:
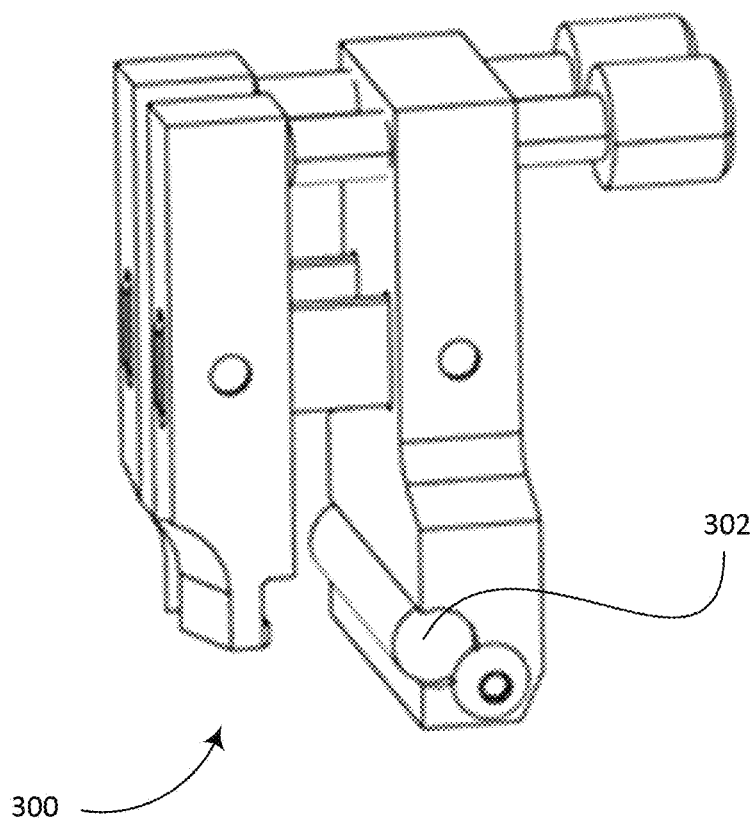
FIG. 5B shows a perspective view of the clamp.

In order the connect two track sections 102, the two track sections 102 to be connected may first be brought into alignment by using a temporary connector that is configured to align the guide rails of the track sections within a predetermined alignment tolerance. As an example, the temporary connector may include an alignment device such as a dowel or the like, sized to fit onto or within the rail or the like. In a particular case, the temporary connector may include a dowel sized to fit into a groove 110 of a guide rail 108 of the track sections. FIG. 5A shows a front perspective view of an embodiment of a temporary connector (in this case, a clamp) 300 that is attached to the track section 102 and in particular, an upper rail of the track section 102 to hold the guide rails 108 on each track section 102 in alignment within the alignment tolerance. FIG. 5B shows a perspective view and additional detail of the clamp 300. In this embodiment, the clamp 300 includes a dowel 302. The dowel 302 is provided to aid in alignment of the guide rails 108 of the first and the second adjacent track sections when the clamp 300 is clamped to the track sections 102 by placing the dowel 302 within a feature of the guide rails 108 (such as groove 110) across the gap between the track sections 102. Placing the dowel 302 within the guide rails 108 is intended to align the track sections within an alignment tolerance by providing greater alignment at the location of the guide rails 108. The clamp 300 can be configured to hold either flat or shaped rails within an alignment tolerance. In some cases a single dowel may be used, while in other cases a plurality of dowels may be used, for example one for each groove. In some cases, the dowel 302 may be shaped to correspond with the shape of the guide rails.

In the case of shaped rails 108, the clamp 300 can provide alignment both vertically and horizontally because it can contact with a surface in a vertical direction as well as in a horizontal direction (as would be the case in a flat rail). Having the clamp 300 keep alignment of the wheel/bearing riding surfaces of the guide rails 108 within an alignment tolerance is intended to provide for less wear on the wheels/bearings and less noise, vibration and the like. In this embodiment, the clamping position and clamping force of clamp 300 may be adjusted independently for each track section 102 to which clamp 300 is clamped. This allows for the alignment to be focused on the dowell and the rails rather than on another part of the track section where the clamp makes contact. It will be understood that various types of clamps with attached or separate dowels (or the like) may be used as appropriate.

Figure 5C:
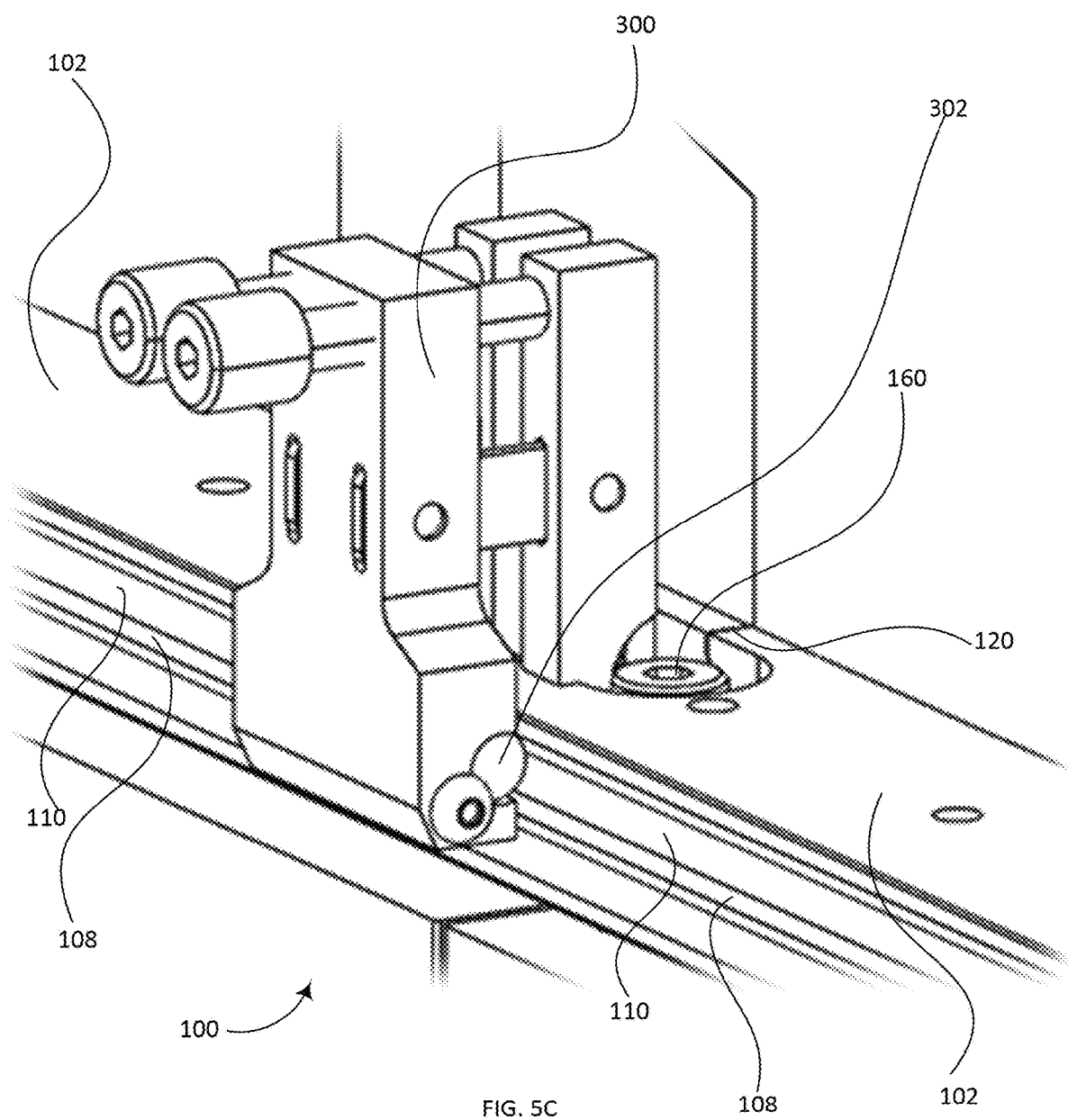
FIG. 5C shows a perspective view of the clamp of FIG. 5B when connecting track sections.

FIG. 5C illustrates setting the temporary clamp 300 with the dowel 302 in the shaped groove 110 on a front face of a track. In particular, the dowel is positioned across a joint 120 between a first track section 102 and a second track section 102. In this particular case, the goal is to align a guide rail 108 on each of the first and second track sections and hold the track sections 106 in alignment following connection. The clamp 300 is intended to hold the front face of the first and second track sections, and in particular, the guide rail, in alignment for further processing. In some cases, the clamp may be set with a clamp force of, for example, 1000 N. The clamp 300 and dowel 302 or the like can be selected accordingly as long as the clamp 300 and dowel 302 are able to hold the track sections 102 and, in particular, the guide rails 108 in alignment to a predetermined alignment tolerance.

Figure 6:
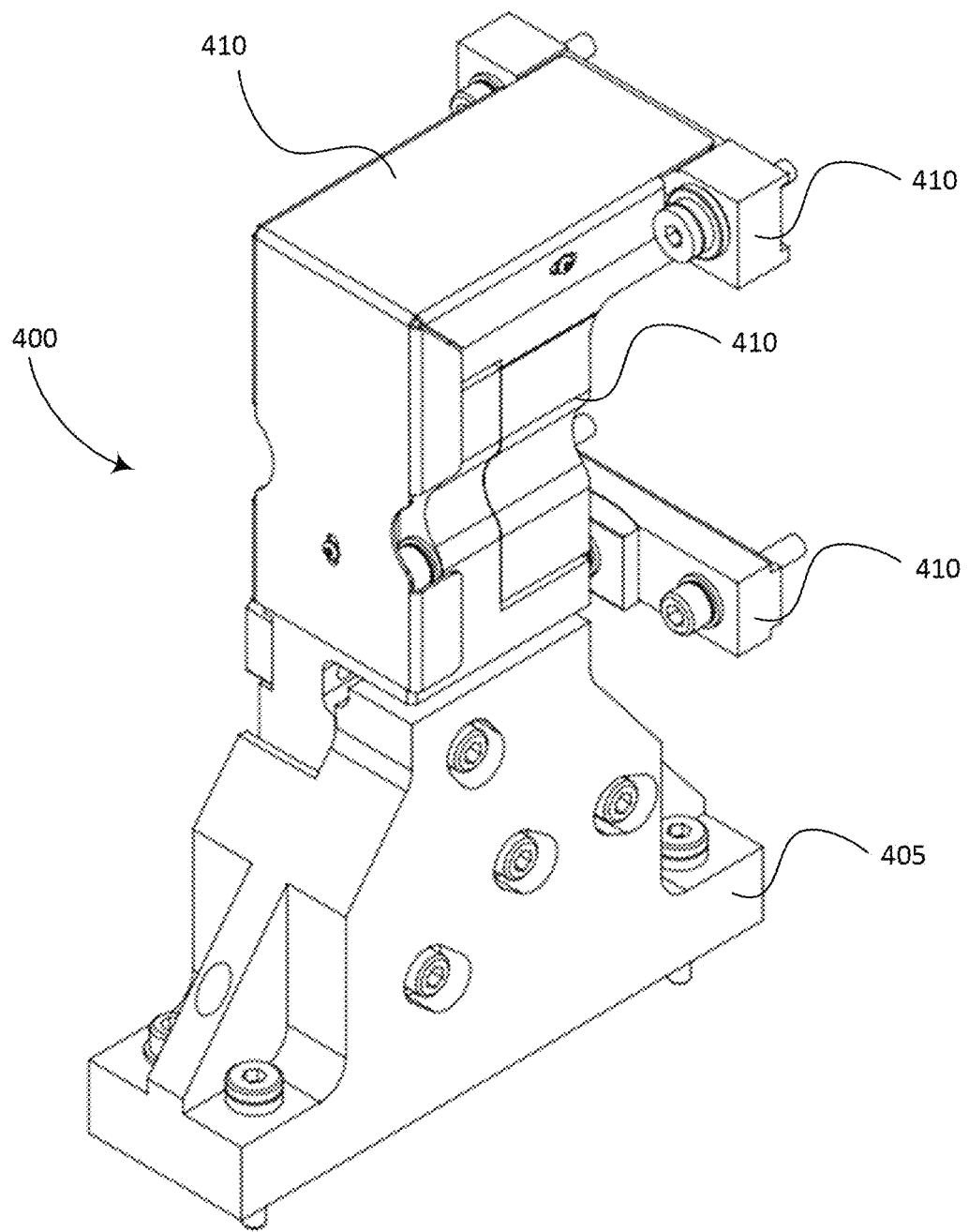
FIG. 6 shows a perspective view of an embodiment of a mounting stand for conveyor track.

FIG. 6 is a perspective view of a system for supporting and connecting conveyor track sections according to an embodiment herein. In particular, the system includes a mounting stand 400. In this embodiment, the mounting stand 400 is configured to be adjustable across at least five (and in some cases six) degrees of freedom such that it can be adjusted to connect with and hold a track section 102 in a precise location in three-dimensional space in order to achieve a desired alignment with an adjacent track section. The mounting stand 400 can be positioned at various points along a track section, including the middle of a track section or at an end of a track section (for example, a joint between track sections). In particular, when two adjacent track sections are aligned, for example, by use of the clamp 300 above, a plurality of mounting stands can be fastened to the ground or other support structure for the track sections and then adjusted to connect with each of the adjacent track sections to maintain the alignment of the track sections.

As shown in FIG. 6, the mounting stand includes a base 405 for attachment to the ground or appropriate surface and a plurality of adjustable elements 410 that are configured to be adapted to the particular needs of the track section that is being supported. FIGS. 7 to 12 illustrate example adjustability of the adjustable element 410 of the mounting stand 400 in relation to the track section 102. For reference, movement in various directions is related to axes arranged in those directions and can include movement along the axes and/or rotation about the axes. In FIGS. 7-12, there are five adjustable sections illustrated, however, alternate arrangements may have as few as three adjustable sections, each configured to move along each of three axes and rotate about the axes to provide up to 6 degrees of freedom.

Figure 7:
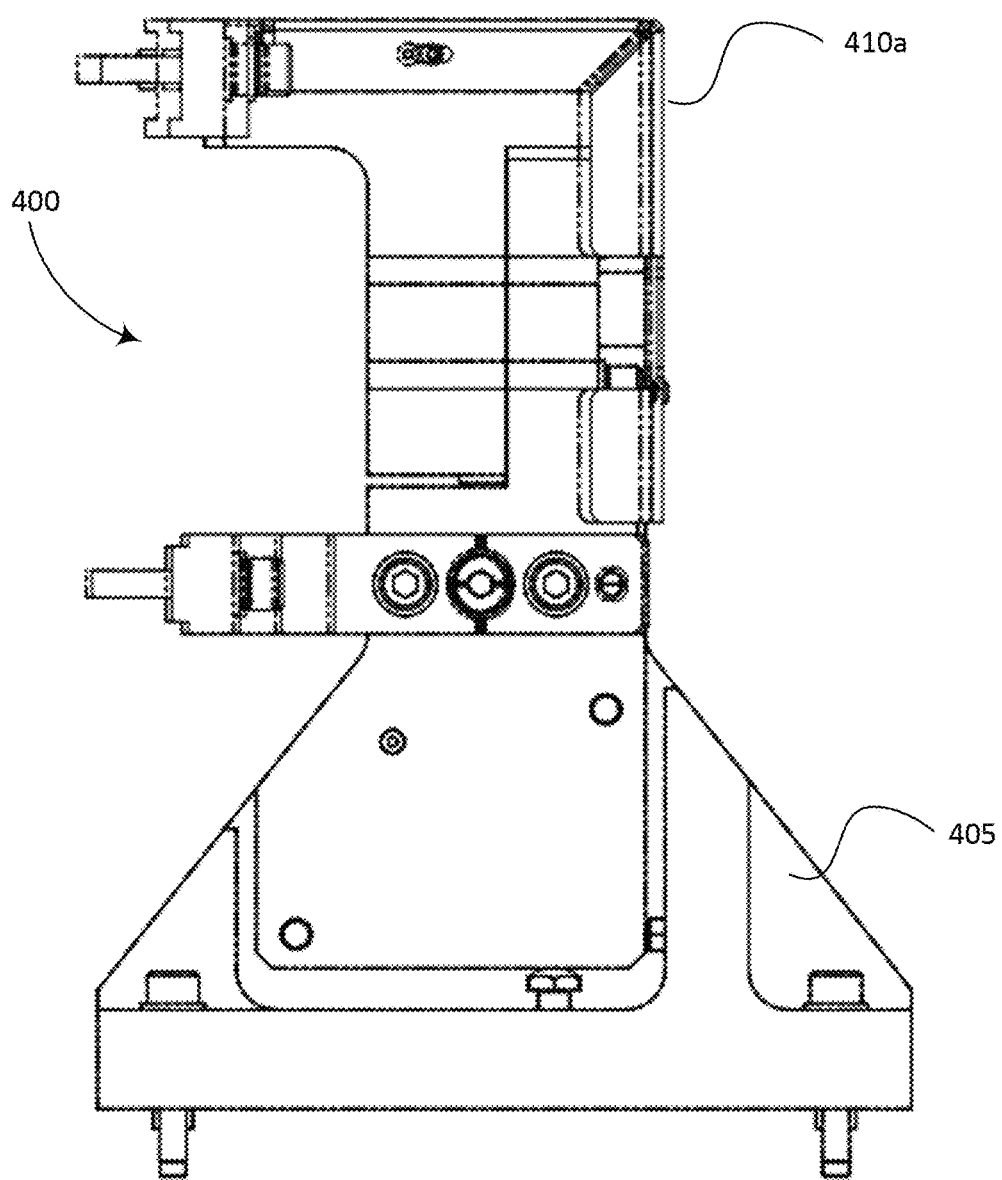
FIG. 7 shows a side view of the mounting stand of FIG. 6 illustrating forward and backward adjustability of the mounting stand.

FIG. 7 is a side view of the mounting stand 400 illustrating adjustability towards and away from the track section, that is, forward and backward in FIG. 7 (sometimes called an X-Axis). A first adjustable section 410a of the mounting stand 400 moves forwards and backwards, for example, along rails provided in a base 405 of the mounting stand 400. One or more fasteners, such as a screw, pin, or the like can be provided to hold the first adjustable section 410a in place when appropriately positioned.

Figure 8:
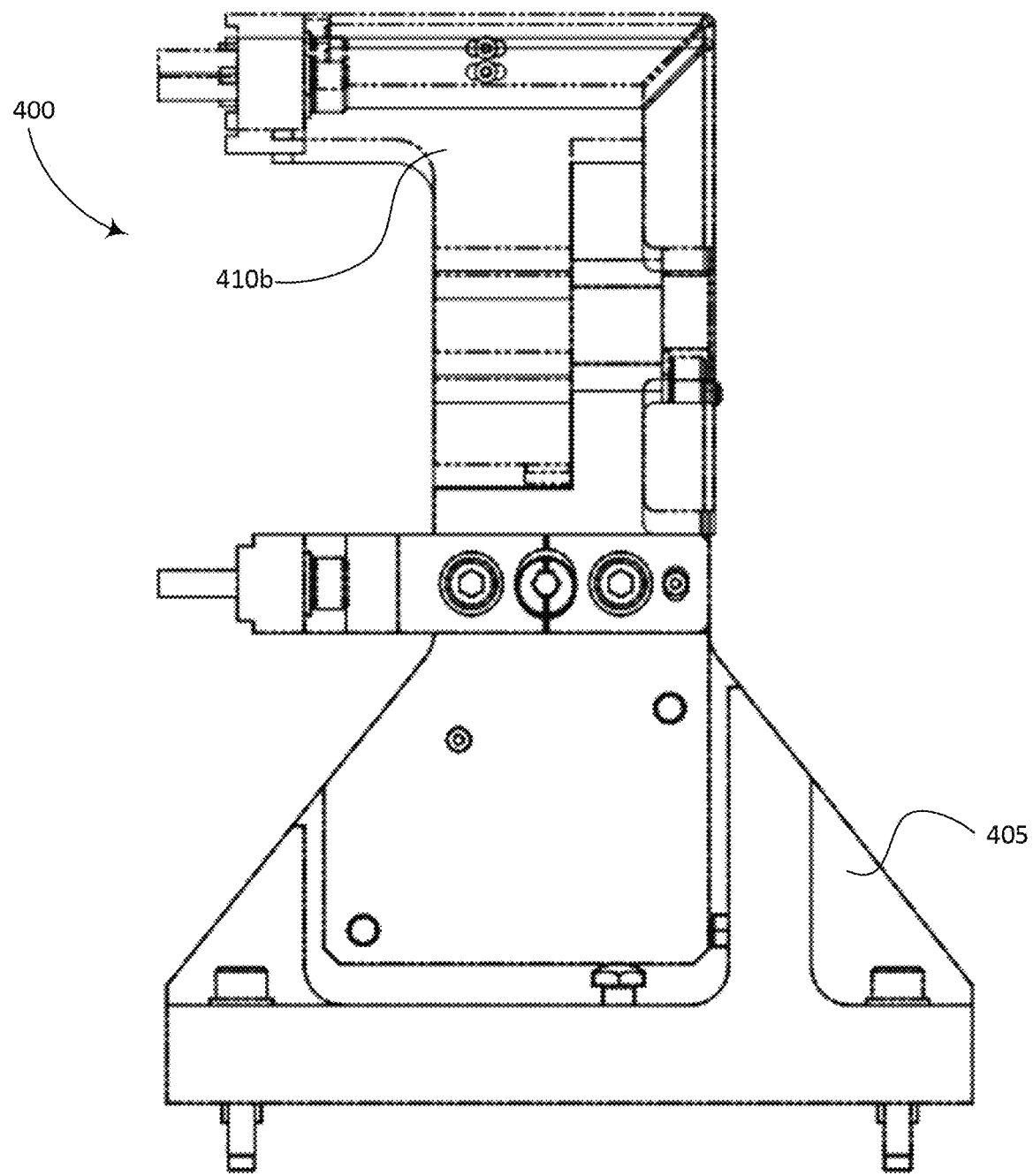
FIG. 8 shows a side view of the mounting stand of FIG. 6 illustrating upward and downward adjustability of the mounting stand.

FIG. 8 is a side view of the mounting stand 400 illustrating adjustability up and down in relation to the track section, that is, upward and downward in FIG. 8 (sometimes called a Y Axis). A second adjustable section 410b of the mounting stand 400 moves upwards and downwards, for example, along rails provided in the first adjustable section 410a of the mounting stand 400 or the like. Again, one or more fasteners can be provided to hold the second adjustable section 410b in an appropriate position.

Figure 9:
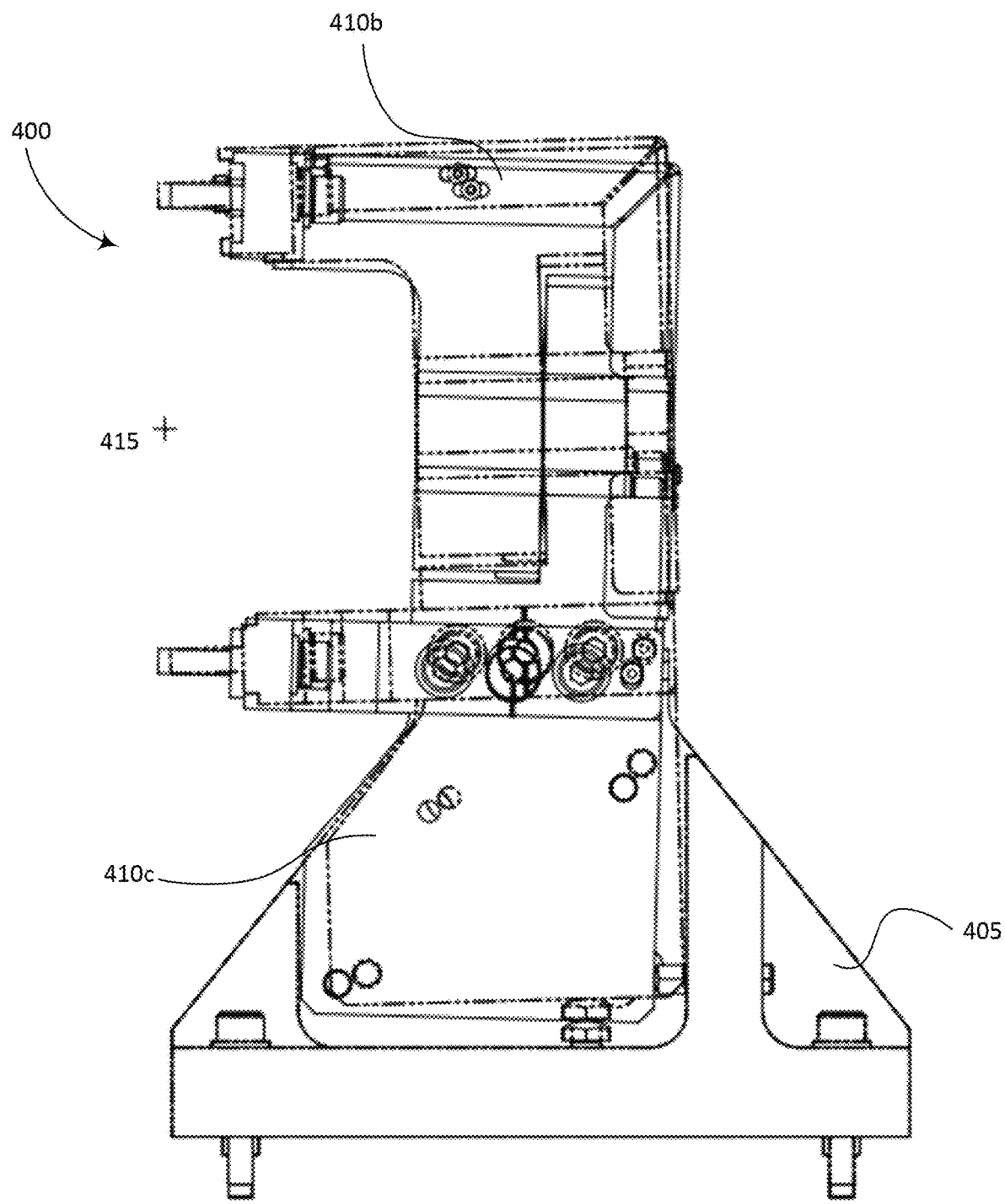
FIG. 9 shows a side view of the mounting stand of FIG. 6 illustrating adjusting pitch of an adjustable section of the mounting stand.

FIG. 9 is a side view of the mounting stand 400 illustrating adjustability about an axis in the sideways direction (Z-Axis) in relation to the track section. This is sometimes referred to as pitch adjustment. In this case, a third adjustable section 410c of the mounting stand 400 moves about the Z-Axis for adjusting pitch of the third adjustable section 410c. The third adjustable section 410c may, for example, move around one or more pivot points in the base 405 of the mounting stand 400 or the like. Again, one or more fasteners can be provided to hold the third adjustable section in an appropriate position. In this case, the rotation is actually about a "virtual" axis 415 that is external to the mounting stand 400.

Figure 10:
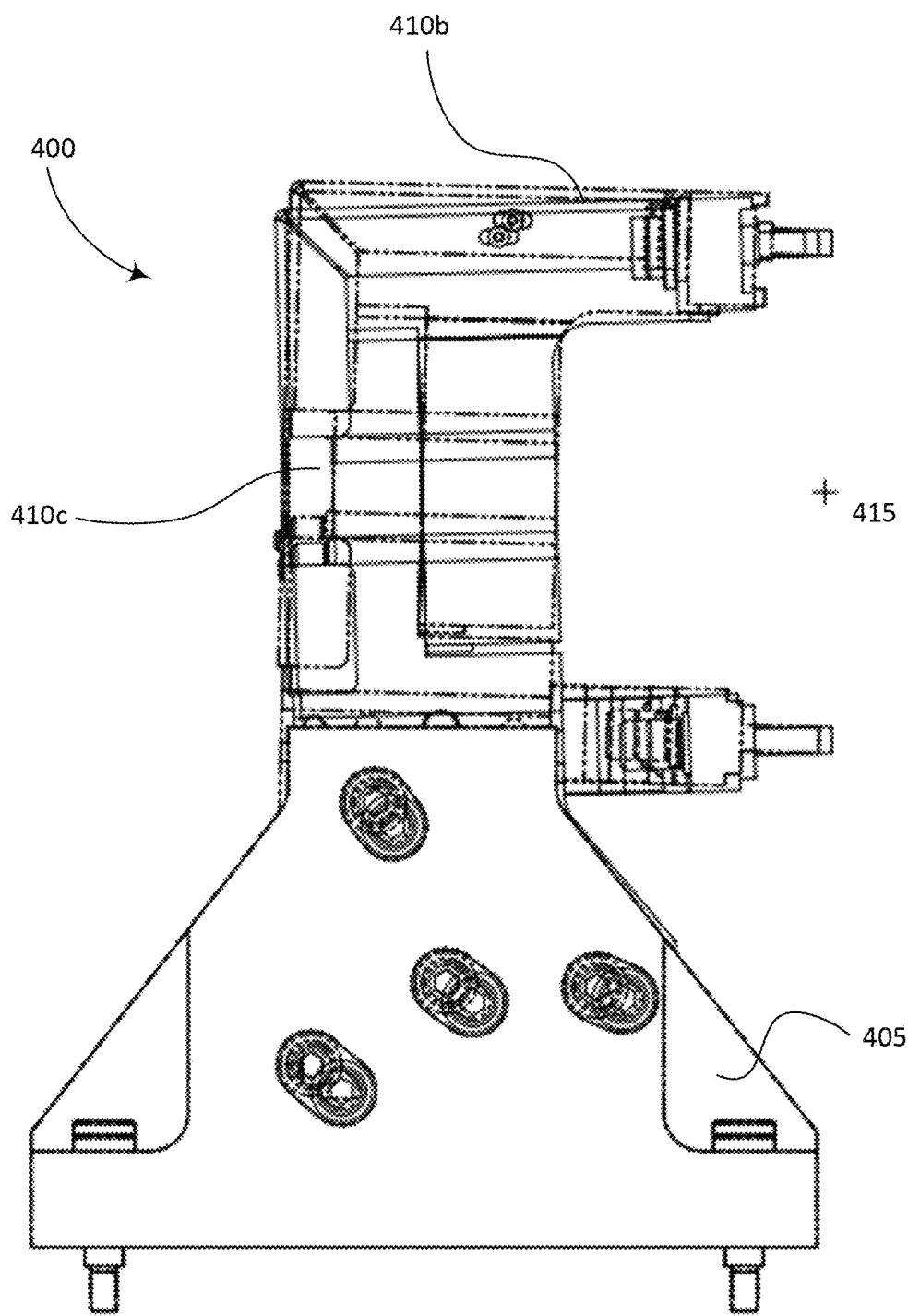
FIG. 10 shows an opposite side view of the mounting stand of FIG. 9 illustrating adjusting pitch of an adjustable section of the mounting stand.

FIG. 10 is an opposite side view of the mounting stand 400 from that in FIG. 9 illustrating adjustability of the pitch around a sideways directed axis 415 (Z-Axis) in relation to the track section. FIG. 10 illustrates adjustment of fasteners on the base 405 that can interact with the third adjustable section 410c.

Figure 11:
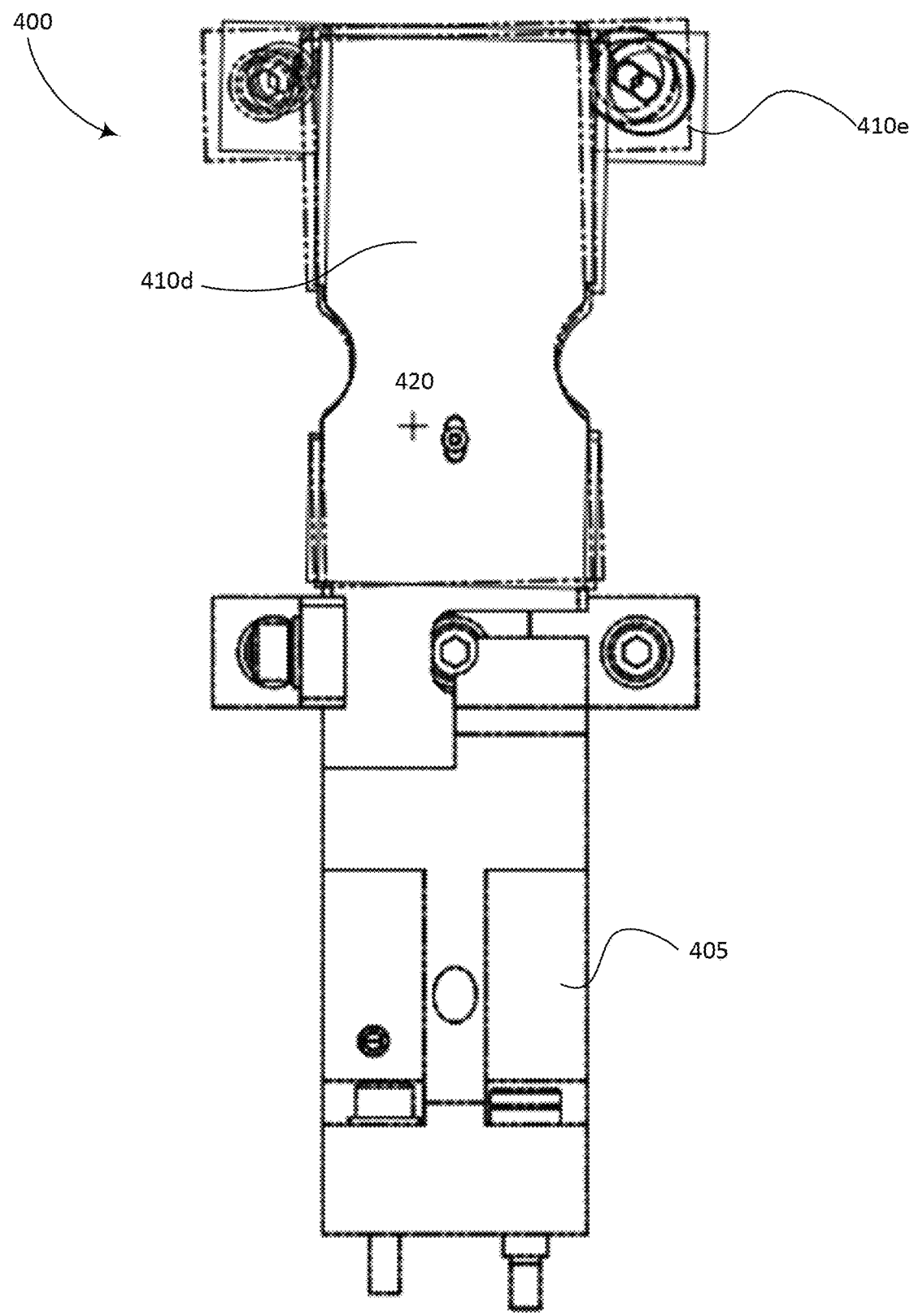
FIG. 11 shows a back view of the mounting stand of FIG. 6 illustrating adjusting roll of an adjustable section of the mounting stand.

FIG. 11 is a rear view of the mounting stand 400 illustrating adjustability about an axis in the horizontal direction (X-Axis) 420 in relation to the track section. This is sometimes referred to as roll adjustment. In this case, a fourth adjustable section 410d of the mounting stand 400 moves about the X-Axis 420 for adjusting roll. The fourth adjustable section 410d may, for example, move about a pivot pin or the like provided to, for example, the base 405 or the like. Again, one or more fasteners can be provided to hold the fourth adjustable section 410d in an appropriate position once positioned. Although not illustrated, the fourth adjustable section 410d may also be configured to be moveable in a left-right direction as seen in FIG. 11, for example, along rails or the like provided to the base 405.

Figure 12:
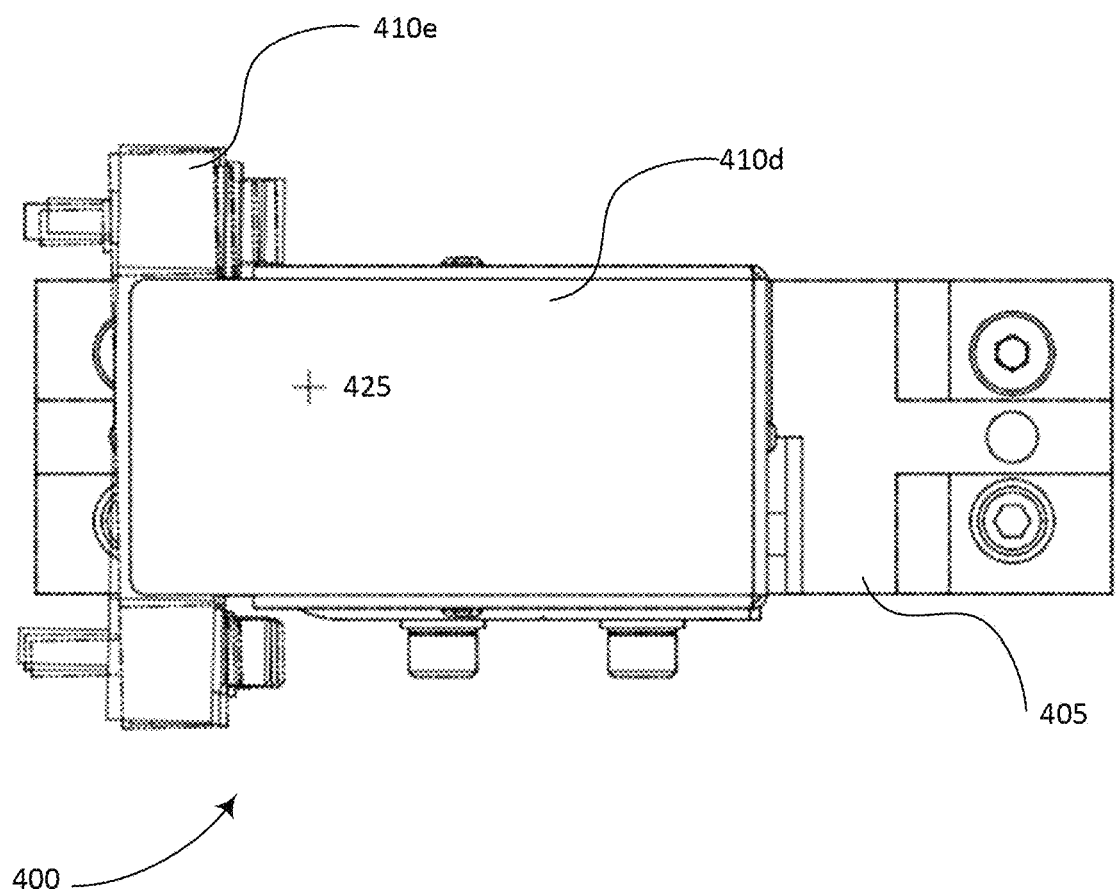
FIG. 12 shows a top view of the mounting stand of FIG. 6 illustrating adjusting yaw of an adjustable section of the mounting stand.

FIG. 12 is a top view of the mounting stand 400 illustrating adjustability about an axis in the vertical direction (Y-Axis) in relation to the track section. In this case, fifth adjustable section 410e of the mounting stand 400 rotates about the Y-Axis for adjusting yaw of the fifth adjustable section 410e. The fifth adjustable section 410e may, for example, move about a pivot pin provided to, for example, the fourth adjustable section 410d or the like. Again, a fastener is provided to hold the upper-forward section in an appropriate position once positioned.

As illustrated in FIGS. 7-12, the various adjustable sections may have some overlapping elements that move together with each other in order to effect appropriate adjustment. Further, the various adjustable sections may include various different fasteners to hold each adjustable section in position. Still further, the base and predetermined adjustable sections may be provided with fasteners for connecting with the ground or platform for the track section as well as with the track section itself. It will be understood that, upon reviewing the present description and figures, various configurations may provide the 5 or 6 degrees of freedom to allow a track section to be mounted with an appropriate level of alignment for the rails of the track section.

As will be understood, an embodiment of a method for supporting and connecting conveyor track can include: installing and securing a mounting stand on a stable surface; using a temporary clamp to align the track sections (or rails thereof); adjusting the mounting stand over 5 or 6 degrees of freedom to allow the mounting stand to connect to the track section(s) without changing the alignment held by the temporary clamp; connecting the mounting stand to the track section(s); and releasing the temporary clamp.

The adjusting the mounting stand over 5 or 6 degrees of freedom can be achieved by, as noted above, providing the mounting stand with a plurality of adjustable sections and adjusting each of the plurality of adjustable sections in relation to the base and the track sections to match with the adjacent track sections. In particular, the plurality of adjustable sections may include at least three adjustable sections, each of which can move along one of three axes and rotate about at least one of the three axes to provide 6 degrees of freedom.

In the embodiment described above for FIGS. 7-12, the adjusting the plurality of adjustable sections includes adjusting a first adjustable section along a first axis toward and away from the track section, adjusting a second adjustable section along a second axis in a vertical direction, adjusting a third adjustable section by rotating about a third axis in a horizontal direction, adjusting a fourth adjustable section by rotating about the first axis in relation to the track section, and adjusting a fifth adjustable section by rotating about the second axis in relation to the track section. A sixth degree of freedom can be obtained by adjusting the fourth adjustable section along the third axis in relation to the track section.

As described above, the attaching a temporary clamp can include placing an alignment device onto a rail of the adjacent track sections and clamping the adjacent track sections such that the alignment device maintains alignment of the rail as between the adjacent track sections. In the embodiment above, involving the use of a dowel in a feature or the rail, the alignment device provides alignment in both horizontal and vertical directions.

In the preceding description, for purposes of explanation, numerous details are set forth in order to provide a thorough understanding of the embodiments. However, it will be apparent to one skilled in the art that these specific details may not be required. In other instances, well-known structures may be shown in block diagram form in order not to obscure the understanding. Further, it will be understood that various elements/aspects of each embodiment described herein may be used with other embodiments as appropriate and that each embodiment may include a sub-set of the elements/aspects described therewith.

The above-described embodiments are intended to be examples only. Alterations, modifications and variations can be effected to the particular embodiments by those of skill in the art without departing from the scope, which is defined solely by the claims appended hereto.

What is claimed is:

1. A system for supporting and connecting conveyor track sections, the system comprising:
    a mounting stand having at least 5 degrees of freedom, the mounting stand comprising:
    a base configured to connect with a stable surface on which the mounting stand is to be supported in order to support the conveyor track sections; and
    at least three adjustable sections, with each of the at least three adjustable sections being adjustable in relation to the base and the track section in at least one of the degrees of freedom, wherein at least one of the at least three adjustable sections connects with the track sections,
    wherein the at least three adjustable sections comprise:
        a first adjustable section configured to move in relation to one of three axes as a first degree of freedom and to move in relation to one of three axes as a second degree of freedom;
        a second adjustable section configured to move in relation to one of three axes as a third degree of freedom and rotate about one of three axes as a fourth degree of freedom;
        a third adjustable section configured to move in relation to one of three axes as a fifth degree of freedom.

2. A system according to claim 1, wherein:
    the first adjustable section is configured to move horizontally along a first axis toward and away from the track section as a first degree of freedom and to pivot around the first axis as a second degree of freedom;
    the second adjustable section is configured to move along a second axis in a vertical direction in relation to the track section as a third degree of freedom and rotate about the second axis in relation to the base as a fourth degree of freedom;
    the third adjustable section is configured to move in relation to a third axis in relation to the track section as a fifth degree of freedom.

3. A system according to claim 1, wherein the third adjustable section is also configured to move along the third axis in relation to the track section as a sixth degree of freedom.

4. A system according to claim 1, wherein the first adjustable section and the second adjustable section are connected and movable in relation to each other.

5. A system according to claim 1, wherein the second adjustable section and the third adjustable section are connected such that the second adjustable section moves together with the third adjustable section when the third adjustable section is rotated in relation to the base.

6. A method for supporting and connecting conveyor track sections, the method comprising:
    installing and securing a base of a mounting stand on a stable surface;
    attaching a temporary clamp to align adjacent track sections;
    adjusting the mounting stand about at least 5 degrees of freedom to match with the adjacent track sections;

connecting the mounting stand to the adjacent track sections while maintaining the alignment provided by the temporary clamp; and releasing the temporary clamp, wherein the adjusting the mounting stand about at least 5 degrees of freedom comprises:

adjusting a first adjustable section to move in relation to one of three axes as a first degree of freedom and to move in relation to one of three axes as a second degree of freedom;

adjusting a second adjustable section to move in relation to one of three axes as a third degree of freedom and rotate about one of three axes as a fourth degree of freedom; and adjusting a third adjustable section to move in relation to one of three axes as a fifth degree of freedom, and wherein at least one of the first, second and third adjustable sections is connected with the base.

7. A method according to claim 6, wherein:

the first adjustable section is configured to move horizontally along a first axis toward and away from the track section as a first degree of freedom and to pivot around the first axis as a second degree of freedom;

the second adjustable section is configured to move along a second axis in a vertical direction in relation to the track section as a third degree of freedom and rotate about the second axis in relation to the base as a fourth degree of freedom;

the third adjustable section is configured to move in relation to a third axis in relation to the track section as a fifth degree of freedom.

8. A method according to claim 7, wherein the adjusting further comprises adjusting the third adjustable section along the third axis in relation to the track section as a sixth degree of freedom.

9. A method according to claim 6, wherein the attaching a temporary clamp comprises placing an alignment device onto a rail of the adjacent track sections and clamping the adjacent track sections such that the alignment device maintains alignment of the rail as between the adjacent track sections.

10. A method according to claim 9, wherein the alignment device provides alignment in both horizontal and vertical directions.

11. A mounting stand for supporting and connecting conveyor track sections, the mounting stand comprising:

a base configured to connect with a stable surface; and a plurality of adjustable sections, wherein the plurality of adjustable sections comprise:

a first adjustable section configured to move along a first axis toward and away from the track section as a first degree of freedom;

a second adjustable section configured to move along a second axis in a vertical direction in relation to the track section as a second degree of freedom;

a third adjustable section configured to rotate about a third axis in a horizontal direction in relation to the track section as a third degree of freedom;

a fourth adjustable section configured to rotate about the first axis in relation to the track section as a fourth degree of freedom; and a fifth adjustable section configured to rotate about the second axis in relation to the track section as a fifth degree of freedom, wherein at least one of the plurality of adjustable sections connects with the track sections and at least a different one of the plurality of adjustable sections connects with the base.

* * * * *